United States Patent
Chawla et al.

(10) Patent No.: US 9,648,293 B2
(45) Date of Patent: May 9, 2017

(54) COLOR MODEL LOOK-UP TABLE GENERATION

(71) Applicant: GoPro, Inc., San Mateo, CA (US)

(72) Inventors: Sumit Chawla, San Carlos, CA (US); Elizabeth Torres Edwards, San Jose, CA (US); Ying Chen, Tianjin (CN)

(73) Assignee: GOPRO, INC., San Mateo, CA (US)

(*) Notice: Subject to any disclaimer, the term of this patent is extended or adjusted under 35 U.S.C. 154(b) by 16 days.

(21) Appl. No.: 14/521,460

(22) Filed: Oct. 22, 2014

(65) Prior Publication Data

US 2015/0271398 A1    Sep. 24, 2015

Related U.S. Application Data

(60) Provisional application No. 61/969,718, filed on Mar. 24, 2014.

(51) Int. Cl.
  *H04N 5/232* (2006.01)
  *H04N 9/64* (2006.01)
  *H04N 1/60* (2006.01)
  *H04N 9/68* (2006.01)

(52) U.S. Cl.
  CPC ........... *H04N 9/643* (2013.01); *H04N 1/6033* (2013.01); *H04N 9/68* (2013.01)

(58) Field of Classification Search
  CPC .................................................. H04N 5/23229
  USPC .............................. 348/273, 223.1; 345/594
  See application file for complete search history.

(56) References Cited

U.S. PATENT DOCUMENTS

| | | | |
|---|---|---|---|
| 2003/0138141 | A1 | 7/2003 | Quan et al. |
| 2007/0126894 | A1 | 6/2007 | Stroker |
| 2008/0013828 | A1 | 1/2008 | Pearson et al. |
| 2009/0079756 | A1 | 3/2009 | Matsuura |
| 2011/0102869 | A1* | 5/2011 | Hirayama .......... H04N 1/40012 358/518 |

OTHER PUBLICATIONS

PCT International Search Report and Written Opinion for PCT/US2015/014006, Apr. 27, 2015, 9 Pages.

* cited by examiner

*Primary Examiner* — Joel Fosselman
(74) *Attorney, Agent, or Firm* — Young Basile Hanlon & MacFarlane, P.C.

(57) ABSTRACT

The conversion of RAW data captured by a camera can have artifacts in smoothness of various hues for varying chroma. To optimize smoothness and color accuracy, transform coefficients defining conversion of a standard color model to a target color model are determined. The RAW data is converted to data in a standard color model and the data in the standard color model is converted to data in the target color model using the transform coefficients. The process is repeated for various lightness levels and combined into a look up table to efficiently convert RAW data to data in the target color model for various lightness levels.

16 Claims, 6 Drawing Sheets

COLOR MODEL LOOK-UP TABLE GENERATION

CROSS REFERENCE TO RELATED APPLICATION

This application claims the benefit of U.S. Provisional Application No. 61/969,718, filed Mar. 24, 2014, the contents of which are incorporated by reference herein in its entirety.

BACKGROUND

1. Field of Art

The disclosure generally relates to the field of digital image and video processing, and more particularly to adjusting a color model of a digital image.

2. Description of the Related Art

Digital cameras capture images using an electronic image sensor. Example image sensors use CCD (charge-coupled device) or CMOS (complementary metal-oxide semiconductor) technology. For example, a CMOS image sensor contains photodiodes corresponding to pixels of a captured image. The captured image is presented in a RAW color model associated with the CMOS image sensor. A color model is a mathematical or numerical model representing colors in an image. The chroma, hue, and lightness of the captured image can be adjusted after the image is captured by the camera. The adjustment of the chroma and hue can result in a less than desirable smoothness for various hues with varying chroma. Conventional methods adjust the chroma and hue using 3D look-up tables ("LUTs") for chroma, hue, and lightness that are stored on the camera.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera Configuration

Figure 1:
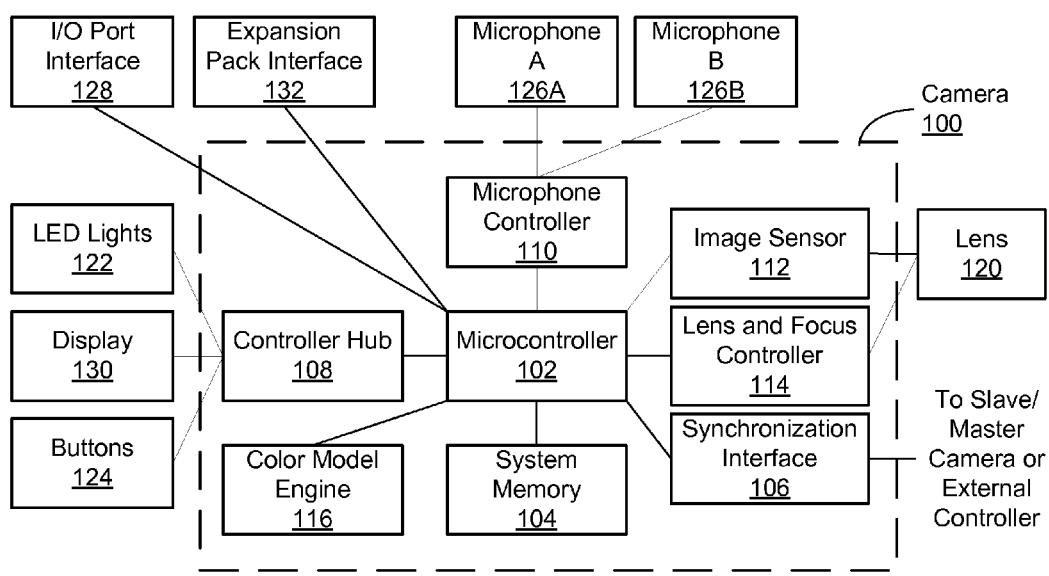
FIG. 1 illustrates an example high-level block diagram of a system for adjusting a color model of a digital image, according to one embodiment.

FIG. 1 is a block diagram illustrating electronic components of a camera 100, according to one embodiment. The camera 100 of the embodiment of FIG. 1 includes one or more microcontrollers 102, a system memory 104, a synchronization interface 106, a controller hub 108, one or more microphone controllers 110, an image sensor 112, a lens and focus controller 114, a color model engine 116, one or more lenses 120, one or more LED lights 122, one or more buttons 124, one or more microphones 126, an I/O port interface 128, a display 130, and an expansion pack interface 132.

The camera 100 includes one or more microcontrollers 102 (such as a processor) that control the operation and functionality of the camera 100. For instance, the microcontrollers 102 can execute computer instructions stored on the memory 104 to perform the functionality described herein. It should be noted that although LUT generation and color model conversion are described herein as performed by the camera 100, in practice, the camera 100 can capture image data, can provide the image data to an external system (such as a computer, a mobile phone, or another camera), and the external system can generate a LUT based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 308 may send information to other user I/O components, such as a speaker.

A microphone controller 110 receives and captures audio signals from one or more microphones, such as microphone 126A and microphone 126B. Although the embodiment of FIG. 3 illustrates two microphones, in practice, the camera can include any number of microphones. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audioports, and the like. Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Color Model Configuration

Figure 2:
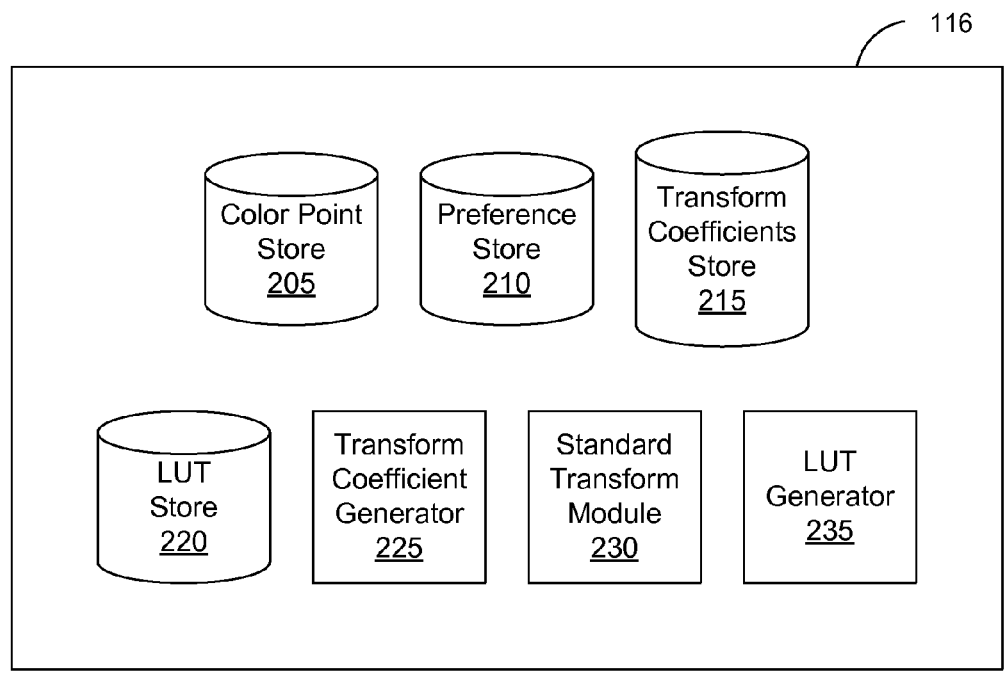
FIG. 2 illustrates an example high-level block diagram of a color model engine, according to one embodiment.

FIG. 2 illustrates an example high-level block diagram of the color model engine, according to one embodiment. In some embodiments, the color model engine 116 is implemented within the system memory 104 of FIG. 1. The color model engine 116 includes a color point store 205, a preference store 210, a transform coefficients store 215, a look up table (LUT) store 220, a transform coefficient generator 225, a standard transform module 230, and a LUT generator 235. The color model engine 116 can include different and/or additional components than those illustrated in the embodiment of FIG. 2 to perform the functionalities described herein.

The color point store 205 stores color model information for various color models. For instance, the color point store 205 can store color model information for RGB-type color models (e.g., sRGB, Adobe RGB, Adobe Wide Gamut RGB, etc.), CIE-type color models (e.g., CIE 1931 XYZ, CIELUV, CIELAB, CIEUVW, etc.), Luma plus chroma/chrominance-based color models (e.g., YIQ, YUV, YDbDr, YPbPr, YCbCr, xcYCC, etc.), hue and saturation-based color models (e.g., HSV, HSL), CMYK-type color models, and any other suitable color model information. In some embodiments, the color point store 205 can store color model information for a RAW RGB color model and one or more unique color models (or "color spaces") that can be defined by a user.

The stored color model information for each color model includes one or more components representing color in the color model. For example, the RGB color model has three components representing color: R for red, G for green, and B for blue. For a chroma and hue model, the components include chroma, hue, and lightness. The one or more components representing a color in a color model will be referred to collectively as a "point" herein. Each point can be stored in an association with a color in a corresponding color model in the color point store 205.

The standard transform module 230 applies a transform and gamma curve manipulation model to RAW points in image data received from the camera 100. Data captured by image sensors 112 vary for each image sensor 112 on a camera. Thus, the color model of the captured data slightly differs image sensor to image sensor, and the standard transform module 230 converts the captured data to a standard color model (such as standard RGB). For example, the standard transform module 230 applies a matrix transform to the RAW points and converts them from the RAW color model to a standard RGB (sRGB) color model. Conventional transforms include a matrix transform (e.g., 3×3 matrix transforms, matrix multiplication transforms, matrix normalization transforms, and the like), gamma curve manipulation transforms, linear transforms (e.g., CIE XYZ to sRGB, etc.), and any other suitable color space transform.

The preference store 210 stores preference information for various points (e.g., the points stored in the color point store 205). Preference information for a point can include predefined tuning information for the point, for example an increase, decrease, or other change in a value associated with one or more components of the point. Preference information can be the same or can differ for one or more points of a color model. Preference information can be based on the color model, and/or can be user-defined or user-selected.

A target color model can be generated based on preference information stored in the preference store 210 applied to one or more "initial" points in an initial color model such as a standard color model (e.g., sRGB). For example, if preference information describes changes to chroma and hue information for an initial point in an initial color model, the target color model is generated by applying the change to chroma and hue information to the initial point in the initial color model. For each point in the initial color model, a mathematical relationship or association can be identified between the initial point and a corresponding "target" point in the target color model. The mathematical relationship can be a linear regression, polynomial regression, or any other suitable mathematical fitting describing the relationship between the initial point of the initial color model and the corresponding target point of the target model. The transform coefficient generator 225 generates transform coefficients (or simply "coefficients" hereinafter) based on the mathematical relationships between initial points in the initial color model and target points in the target color model, and stores the generated coefficients in the transform coefficients store 215. For example, in a polynomial fit, the coefficients are parameters defining the polynomial fit. Thus, in general, coefficients are parameters defining mathematical relationships, such as polynomial fits, between initial points in an initial color model and target points in a target color model. In one embodiment, the initial color model is the standard color model as generated by the standard transform module 230 from RAW points or data in a RAW color model.

The look up table (LUT) generator 235 generates a LUT for each of one or more transforms mapping an initial color model to a target color model based on the relationships between the initial points and corresponding target points for one or more lightness levels. Each generated LUT stores associations between initial points in the initial color model and target points in the target color model based on the transform coefficients and mathematical relationship associated with the initial points in the initial color model and corresponding target points in the target color model for at least one lightness level. In one embodiment, the LUT stores chroma and hue information in an initial color model, and corresponding chroma and/or hue information in a target color model. Thus, the LUT defines optimized points for the chroma and hue information for each of one or more initial points within the target color model. The LUTs generated by the LUT generator 235 are stored in the LUT store 220. In various embodiments, a plurality of LUTs can be combined by the LUT generator 235 to produce a combined LUT, and the combined LUT can be stored in the LUT store 220. The LUTs can be stored in association with the initial color model, the target color model, or any combination thereof.

Example Color Model

Figure 3A:
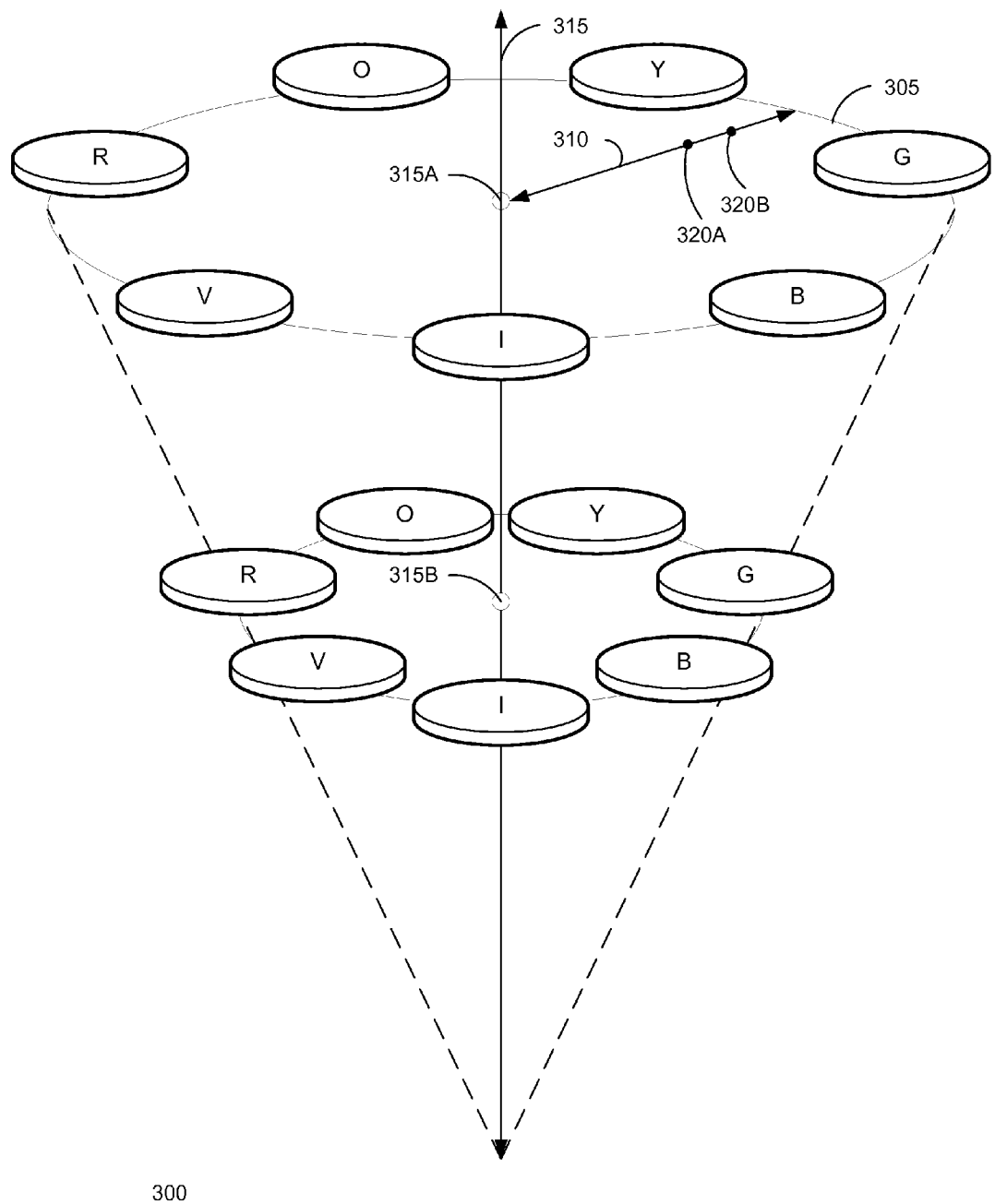
FIG. 3A illustrates an example color model based on chroma, hue, and lightness, according to one embodiment.

FIG. 3A illustrates an example color model 300 based on chroma, hue, and lightness, according to one embodiment. A chroma, hue, and lightness color model is illustrated for the purposes of discussion, but it should be noted that any other suitable color model can be used with the processes described herein. Chroma 310 represents saturation, hue 305 represents color, and lightness 315 represents the lightness of the chroma 310 and hue 305. For varying lightness measures 315A and 315B, various points 320A and 320B representing chroma are determined for corresponding hue levels 305. As shown in FIG. 3A, various lightness in the color model 300 are represented on various z-axis planes of the color model 300, also shown in FIG. 3B. Adjusting a chroma measure from 320A to 320B can be difficult depending on a corresponding hue measure. For example, adjusting chroma 310 for a red hue 305 varies saturation of red more noticeably than adjusting chroma 310 for a green hue 305

Figure 3B:
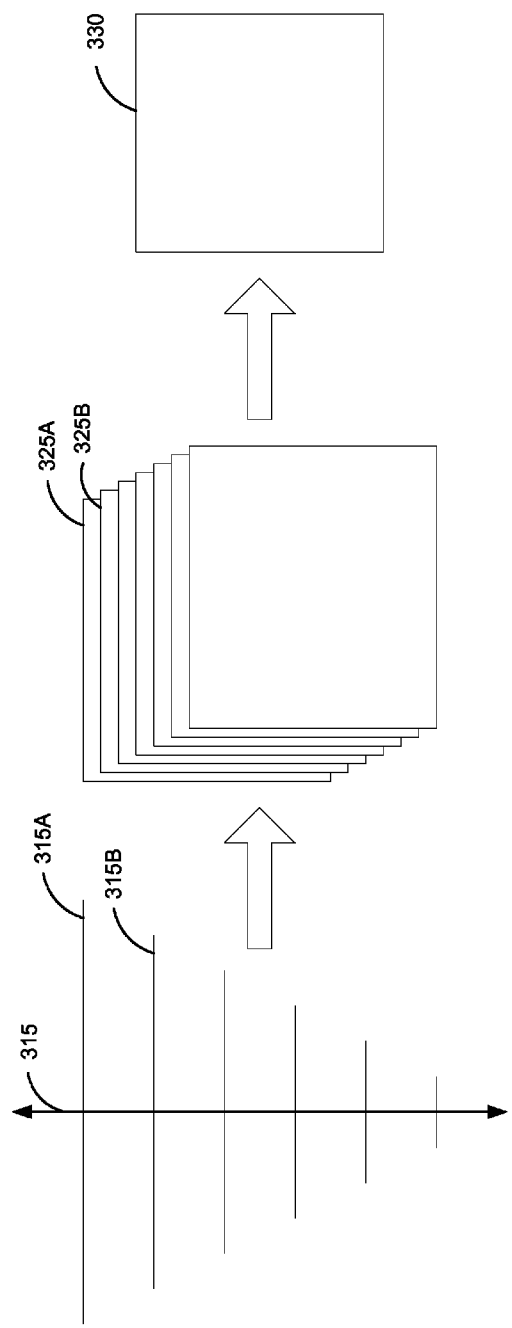
FIG. 3B illustrates a concept diagram of generating 2D look up tables (LUTs) based on the example color model of FIG. 3A, according to one embodiment.

FIG. 3B illustrates the generation of 2D look up tables (LUTs) based on the example color model of FIG. 3A, according to one embodiment. A combined LUT 330 is generated for various LUTs 325, each associated with a lightness level 315. Following the example of a chroma and hue color model 300, LUTs 325A and 325B are generated for lightness levels 315A, 315B. A plurality of the LUTs 325 are combined (e.g., by addition, subtraction, average, or any other suitable mathematical combination of mappings from points in the initial color model to points in the target color model) to generate one or more combined LUTs 330. For example, LUTs 325A and 325B can be generated for lightness 315A (representative of 100% light) and lightness 315B (representative of 75% light), respectively. A combined LUT 330 can be generated by averaging, for each point in an initial color model, the point of the target color model in LUT 325A and LUT 325B. The combined LUT maps a point in the initial color model to a point in the target color model representative of an average of all points in the target color model mapped to the point in the initial color model by the LUTs 325. The process of generating LUTs 325 for various lightness 315 levels of the chroma and hue color model 300 and combining a plurality of the generated LUTs 325 to generate one or more combined LUTs 330 is further described below in FIGS. 4 and 5.

Figure 4:
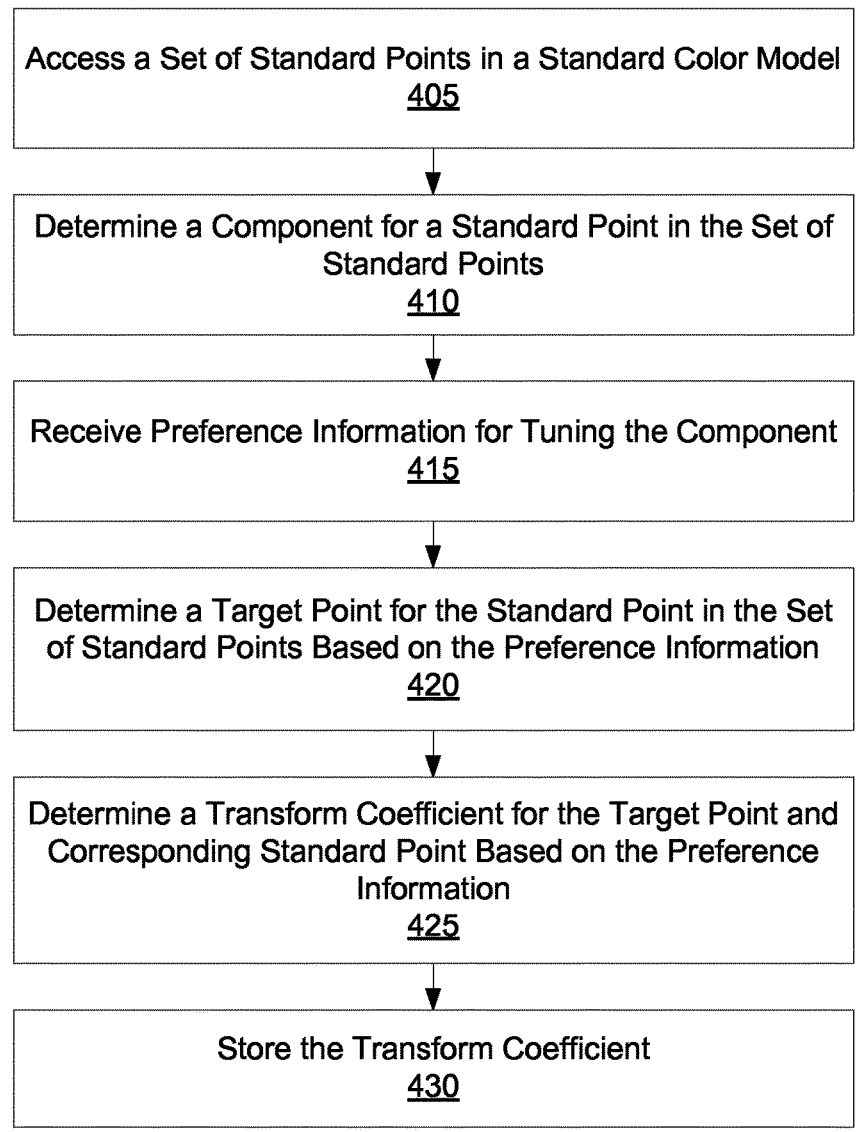
FIG. 4 illustrates a method for determining transform coefficients for a target color model based on a standard color model, according to one embodiment.

Determining Transform Coefficients from a Standard Color Model to a Target Color Model FIG. 4 illustrates a method for determining transform coefficients for a target color model based on a standard color model, according to one embodiment. In other embodiments, the method includes different, additional, or fewer steps than those depicted by FIG. 4. Additionally, in some embodiments, the steps described in conjunction with FIG. 4 may be performed in different orders.

A set of points are accessed 405 within a standard color model and, herein, these points of the standard color model are referred to as "standard points." As described previously in FIG. 2, a point includes color model components (e.g., a point in the RGB color model includes components R, G, B; a point in a chroma hue model includes components chroma, hue, and lightness).

Components of each standard point in the set of standard points are determined 410. If the standard RGB color model is used, then chroma and hue components can be determined based on R, G, and B values associated with the standard points. For example, the R, G, and B values associated with the standard points can be converted to chroma and hue components using RGB to HSV or HSL conversions, conversion charts, or any other suitable conversion method. In alternative methods, the components of each standard point can be the R, G, B values themselves, lightness components, or any other suitable component of various color models.

Preference information is received 415 for tuning the components of the set of standard points. Preference information for tuning components of a point can be predefined tuning information for the point such as increasing, decreasing, or otherwise altering one or more of the components of the point. Preference information can be component-specific. Following the previous example, chroma and hue components can be tuned using preference information specifying how to adjust one or more of the components in the initial color model. Preference information can specify adjustments in, for instance, hue color, chroma, or both hue color and chroma. Preference information can be stored in the preference store 210.

A target point is determined 420 for each standard point in the set of standard points based on the preference information. The preference information is applied to one or more of the standard points in the set of standard points to determine 420 a corresponding target point in a target color model. For example, the preference information can specify an increase in hue and a decrease in chroma. The determined target point can be stored in the color point store 205 and can be stored in association with the target color model, the standard color model, or any combination thereof.

One or more transform coefficients are determined 425 for each standard point in the set of standard points based on the preference information. Transform coefficients are determined 425 based on a relationship between each target point and a corresponding standard point in the set of standard points. For example, the transform coefficient generator 225 applies a mathematical model to determine a relationship between each target and corresponding standard point, and the transform coefficients are coefficients representative of the mathematical model. The transform coefficients are stored 430, for example, in the transform coefficients store 215. The transform coefficients can also be stored in association with the associated mathematical model.

Figure 5:
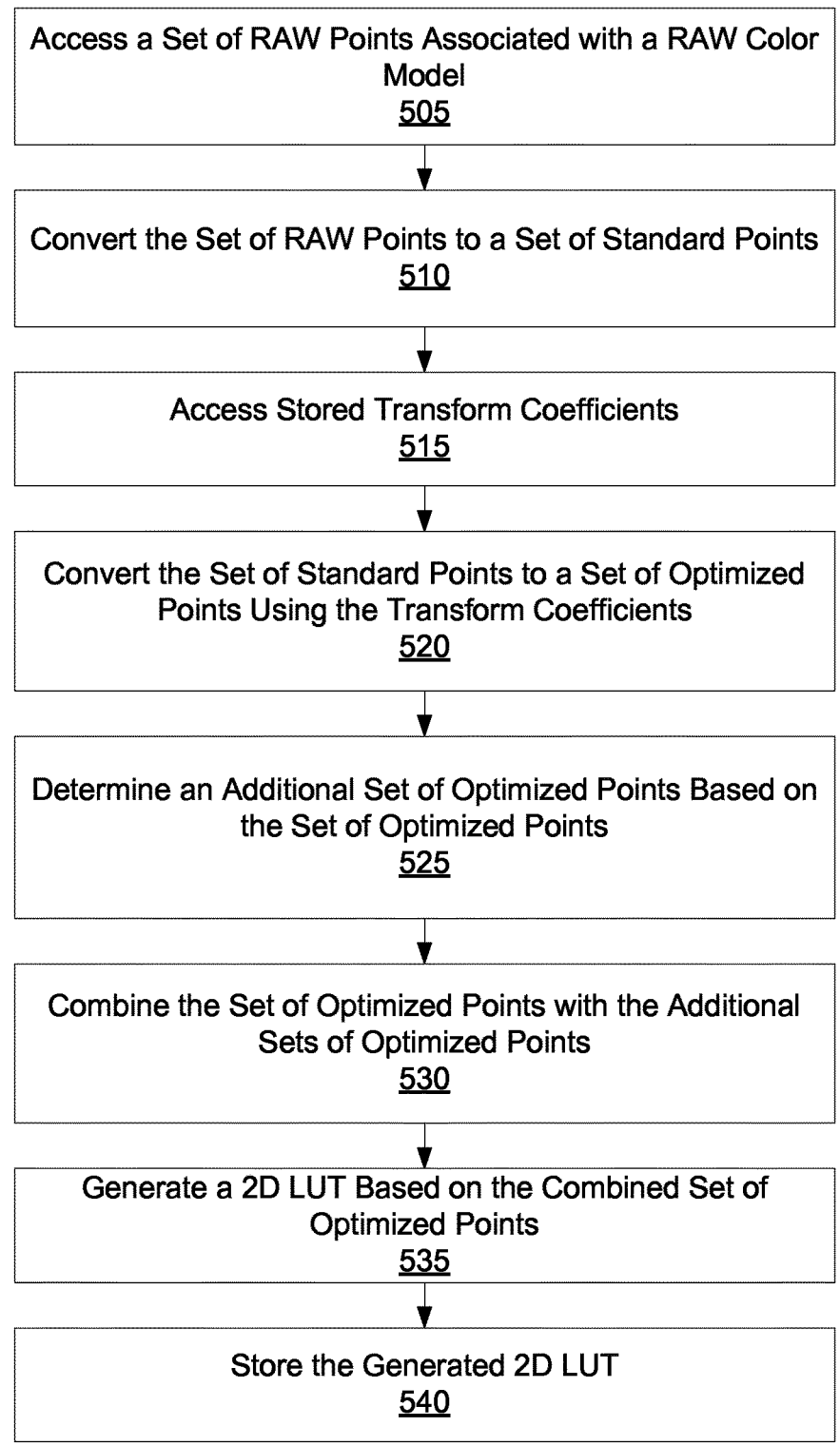
FIG. 5 illustrates a process for converting RAW points to optimized points using transform coefficients, according to one embodiment.

Determining Transform Coefficients from a Standard Color Model to a Target Color Model FIG. 5 illustrates a process for converting RAW points to optimized points using transform coefficients, according to one embodiment. In other embodiments, the method includes different, additional, or fewer steps than those depicted by FIG. 5. Additionally, in some embodiments, the steps described in conjunction with FIG. 5 may be performed in different orders.

A set of RAW points (each RAW point comprising a point in a respective RAW color model) are accessed 505. For example, the RAW points are RGB points within an image from the camera 100. The RAW points can be stored in the color point store 205 in association with the respective RAW color model.

The set of RAW points are converted 510 to a set of standard points. The standard points are points in the standard color model as previously described in FIG. 4. The set of RAW points are converted using, for example, transforms mapping RAW points from the camera in a RAW RGB color model to points in a standard RGB (sRGB) color model.

Stored transform coefficients are accessed 515. The stored transform coefficients are variables of a polynomial fit from the target model to the optimized color model. The set of standard points are converted 520 to a set of optimized points using the transform coefficients in a corresponding mathematical model such as a polynomial fit. Thus, the coefficients are parameters of the polynomial fit. As a result of the conversion, corresponding optimized points are determined. The optimized points are stored in the color point store 205, for example, and can be associated with the target color model. In another embodiment, the optimized points can be stored in association with an optimized color model.

In an alternative embodiment, the transform coefficients accessed from the transform coefficients store 215 are for points not included in the set of standard points to convert 520. In this embodiment, the mathematical model applied to a point can be weighted based on nearby points associated with the transform coefficients. In one embodiment, the mathematical model is a polynomial fitting, defined by:

$$x_a = p_{x0} + p_{x1}x + p_{x2}y + p_{x3}x^2 + p_{x4}xy + p_{x5}y^2$$
$$y_a = p_{y0} + p_{y1}x + p_{y2}y + p_{y3}x^2 + p_{y4}xy + p_{y5}y^2 \quad (1)$$

For polynomial coefficients $p_{x0}$, $p_{x1}$, $p_{x2}$, $p_{x3}$, $p_{x4}$, $p_{x5}$, $p_{y0}$, $p_{y1}$, $p_{y2}$, $p_{y3}$, $p_{y4}$, and $p_{y5}$, where (x, y) is the original points in the warping and ($x_a$, $y_a$) is the second order polynomial of each original point, weighted averages of equation (1) for nearby points ($x_1$, $y_1$) and ($x_2$, $y_2$) can be used to determine ($x_3$, $y_3$). For example, if distance between points ($x_1$, $y_1$) and ($x_3$, $y_3$) is shorter than the distance between points ($x_2$, $y_2$) and ($x_3$, $y_3$), then the polynomial coefficients associated with points ($x_1$, $y_1$) are given a higher weight than the polynomial coefficients associated with points ($x_2$, y2). The weight can be proportional to the distance between the points and weighted by the greater distance or any other value. For example, the weighted optimized point ($x_p$, $y_p$) can be determined by the following:

$$(x_p, y_p) = \frac{\sum_{i=1}^{N} \{W(R_i) \times (x_{ai}, y_{ai})\}}{\sum_{i=1}^{N} \{W(R_i)\}} \quad (2)$$

In equation 2, ($x_{ai}$, $y_{ai}$) is the polynomial of each original point based on equation 1, N is the number of standard points that are used for local weighted mean averages of the mathematical equation (e.g., polynomial fits), and these standard points have a weighting function $W(R_i)$ larger than 0. $W(R_i)$ can be determined as:

$$W(R_i) = \begin{cases} W(R_i), & 0 \le R \le 1 \\ 0, & R > 1 \end{cases} \quad (3)$$

$$R_i = \frac{\sqrt{(x_t - x)^2 + (y_t - y)^2}}{R_M}$$

In equation 3, (x, y) is a standard point to be converted 520, ($x_t$, $y_t$) is a standard point, M is the number of neighboring points of (x, y), and $R_M$ is the distance of (x, y) from its Mth nearest original points. For example, $W(R_i)$ is a monotonically decreasing continuous function of $R_i$, which can be user-defined.

An additional set of optimized points are determined 525 based on the set of optimized points. For example, the additional set of optimized points is determined 525 based on weighted averages of nearby points from the set of optimized points. A similar weighting of mathematical models applied to nearby points can be used to determine the additional set of optimized points.

The set of optimized points are combined 530 with the additional sets of optimized points and a LUT is generated 535 storing association of points in the set of standard points to corresponding points in the set of optimized points and additional set of optimized points. In one embodiment, the generated LUT corresponds to a lightness level of the color model 300. The generated LUT is stored 540. For example, the generated LUT is stored 540 in the LUT store 220.

The generated LUTs stored 540 in the LUT store 220 can be combined as described above to generate one or more combined LUTs that represent various lightness levels. For example, a first generated LUT can be for 100% lightness and a second generated LUT can be for 50% lightness. These two LUTs can be combined to generate a combined LUT. The two LUTs can be combined by adding, subtracting, normalizing, weighting each LUT, or any combination thereof and stored in the LUT store 220. The combined LUT can then be applied, or can be stored for subsequent use.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for synchronizing multiple image sensors through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method comprising:
accessing a set of standard points in a standard color model;
determining a set of components of each standard point in the set of standard points, the set of components representing a color in the standard color model corresponding to the standard point;
receiving preference information for tuning the set of components;
applying the preference information to the set of components of each standard point to generate a target color model, the target color model including a different target point corresponding to each standard point;
determining transform coefficients for each pair of standard point and corresponding target point based on a relationship between the standard point and the corresponding target point by performing a polynomial fit operation to map the set of standard points to the target points, wherein the transform coefficients comprise polynomial coefficients of the polynomial fit operation;
accessing a set of RAW points in a RAW color model;
converting the set of RAW points to a second set of standard points in the standard color model; and
converting the second set of standard points to a set of optimized points in the target color model using the transform coefficients.

2. The computer-implemented method of claim 1, wherein the standard color model is a standard RGB color model.

3. The computer-implemented method of claim 1, wherein the set of components includes chroma and hue.

4. The computer-implemented method of claim 1, wherein preference information is specific to chroma and hue.

5. The computer-implemented method of claim 1, wherein preference information is specific to each point in the set of standard points.

6. The computer-implemented method of claim 1, wherein the RAW color model is a RAW color model of a camera.

7. The computer-implemented method of claim 1, wherein set of standard points and the second set of standard points do not overlap with at least one point.

8. The computer-implemented method of claim 7, wherein the at least one point is converted to an optimized point in the target color model based on a plurality of polynomial fit operations performed on a plurality of nearest standard points.

9. The computer-implemented method of claim 8, wherein the plurality of nearest standard points are points with the shortest distance to the at least one point.

10. A computer-implemented method comprising:
accessing a set of standard points in a standard color model;
determining a component of an initial point in the set of standard points;
receiving preference information for tuning the component;
applying the preference information to the component of the initial point to generate a target point in the target color model;
determining a transform coefficient for the target point and initial point based on a relationship between the initial point and the target point preference information by performing a polynomial fit operation to map the initial point to the target point, wherein the transform coefficient is based on one or more polynomial coefficients of the polynomial fit operation;
accessing a RAW point in a RAW color model;
converting the RAW point to a second point in the standard color model; and
converting the second point to an optimized point in the target color model using the transform coefficient.

11. The computer-implemented method of claim 10, wherein the standard color model is a standard RGB color model.

12. The computer-implemented method of claim 10, wherein the component is selected from a group consisting of: chroma and hue.

13. The computer-implemented method of claim 10, wherein the set of standard points does not include the second point.

14. The computer-implemented method of claim 10, wherein the second point is converted to the optimized point in the target color model based on a plurality of polynomial fit operations performed on a plurality of nearest standard points.

15. The computer-implemented method of claim 14, wherein the plurality of nearest standard points are points with the shortest distance to the second point.

16. A camera, comprising:
a color model store that stores a set of standard points in a standard color model; and
a processor configured to:
access the set of standard points in the standard color model from the color model store,
determine a set of components of each standard point in the set of standard points, the set of components representing a color in the standard color model corresponding to the standard point,
receive preference information for tuning the set of components,
apply the preference information to the set of components of each standard point to generate a target color model, the target color model including a different point corresponding to each standard point,
determine transform coefficients for each pair of standard point and corresponding target point based on a relationship between the standard point and the corresponding target point by performing a polynomial fit operation to map the set of standard points to the target points, wherein the transform coefficients comprise polynomial coefficients of the polynomial fit operation, access a set of RAW points in a RAW color model, convert the set of RAW points to a second set of standard points in the standard color model, and convert the second set of standard points to a set of optimized points in the target color model using the transform coefficients.

* * * * *